(12) United States Patent
Davis et al.

(10) Patent No.: US 8,579,363 B2
(45) Date of Patent: Nov. 12, 2013

(54) ROLLOVER PROTECTION CAB

(75) Inventors: Daniel E. Davis, San Benito, TX (US);
Andres Garcia, Laguna Vista, TX (US);
Ronaldo Barrera, Los Fresnos, TX (US)

(73) Assignee: Daniel E. Davis, San Benito, TX (US)

( * ) Notice: Subject to any disclaimer, the term of this patent is extended or adjusted under 35 U.S.C. 154(b) by 383 days.

(21) Appl. No.: 12/638,434

(22) Filed: Dec. 15, 2009

(65) Prior Publication Data
US 2010/0147603 A1    Jun. 17, 2010

Related U.S. Application Data

(60) Provisional application No. 61/122,991, filed on Dec. 16, 2008.

(51) Int. Cl.
*B62D 55/00* (2006.01)
*B60R 21/02* (2006.01)

(52) U.S. Cl.
USPC .................................. 296/190.03; 180/9.46

(58) Field of Classification Search
USPC .......... 296/190.03, 190.11, 190.08, 102, 155, 296/193.11; 180/89.1, 89.12, 311, 299; 280/756
See application file for complete search history.

(56) References Cited

U.S. PATENT DOCUMENTS

| | | | |
|---|---|---|---|
| 3,632,134 A * | 1/1972 | Babbitt et al. | ................. 280/756 |
| 3,944,017 A | 3/1976 | Foster | |
| 3,976,146 A | 8/1976 | Desourdy | |
| 3,977,489 A | 8/1976 | Cole et al. | |
| 3,990,738 A | 11/1976 | Kolinger et al. | |
| 4,023,827 A | 5/1977 | Matalonis et al. | |
| 4,035,016 A | 7/1977 | Ricca | |
| 4,050,735 A | 9/1977 | Molnar | |
| 4,061,392 A | 12/1977 | Lowder et al. | |
| 4,082,343 A | 4/1978 | Hurt, II et al. | |
| 4,135,756 A | 1/1979 | Hausmann | |
| 4,184,712 A * | 1/1980 | Skahill | ..................... 296/190.03 |
| 4,202,579 A | 5/1980 | Berggren | |
| 4,408,672 A | 10/1983 | Albright et al. | |
| 4,475,740 A | 10/1984 | Strick | |
| 4,516,802 A | 5/1985 | Compton | |
| 4,600,236 A | 7/1986 | Weiss et al. | |
| 4,652,037 A | 3/1987 | Thau et al. | |
| 4,682,145 A | 7/1987 | Brawner, Jr. | |
| 4,693,433 A | 9/1987 | Martin | |

(Continued)

FOREIGN PATENT DOCUMENTS

GB    2441485 A    3/2008
WO    WO-2004043736 A1    5/2004

OTHER PUBLICATIONS

PCT International Search Report and Written Opinion dated Apr. 26, 2010, International Application No. PCT/US2009/068272.

*Primary Examiner* — Glenn Dayoan
*Assistant Examiner* — Sunsurraye Westbrook
(74) *Attorney, Agent, or Firm* — Patterson & Sheridan, L.L.P.

(57) ABSTRACT

Embodiments of the present invention generally relate to a rollover protection cab. In one embodiment, a rollover protection cab for a construction vehicle includes a structural frame defining cabin space for a vehicle operator. The structural frame is operable to substantially maintain the cabin space while withstanding a crushing load greater than or equal to twenty tons. The cab further includes a window; a door; a seat disposed in the cabin space; and controls for operating the vehicle disposed in the cabin space.

20 Claims, 16 Drawing Sheets

(56) References Cited

U.S. PATENT DOCUMENTS

| | | |
|---|---|---|
| 4,952,908 A | 8/1990 | Sanner |
| 5,035,462 A | 7/1991 | Page et al. |
| 5,054,841 A | 10/1991 | Zalman |
| 5,064,242 A | 11/1991 | Fujan et al. |
| 5,150,942 A | 9/1992 | Fujan et al. |
| 5,165,707 A | 11/1992 | Morimanno, Sr. et al. |
| 5,174,622 A | 12/1992 | Gutta |
| 5,280,955 A | 1/1994 | Nelson et al. |
| 5,299,651 A | 4/1994 | Wilson |
| 5,353,826 A | 10/1994 | Davis, Sr. |
| 5,388,884 A | 2/1995 | Keehner et al. |
| 5,584,521 A | 12/1996 | Hathaway et al. |
| 5,655,807 A | 8/1997 | Rosario |
| 5,971,434 A | 10/1999 | Neufeld et al. |
| 6,073,714 A | 6/2000 | McHorse et al. |
| 6,273,494 B1 | 8/2001 | Beigel |
| 6,276,750 B1 * | 8/2001 | Frisch ........................ 296/190.1 |
| 6,374,935 B1 | 4/2002 | Kirschenmann et al. |
| 6,427,795 B1 | 8/2002 | Johnson et al. |
| 6,485,084 B2 * | 11/2002 | Sorensen et al. ............... 296/102 |
| 6,582,010 B2 * | 6/2003 | Sakyo et al. ............. 296/190.08 |
| 7,048,082 B2 * | 5/2006 | Mori et al. .................. 180/89.12 |
| 7,246,835 B1 | 7/2007 | Colburn et al. |
| 7,246,846 B2 | 7/2007 | Shioji et al. |
| 7,258,393 B2 * | 8/2007 | Lindqvist et al. ........ 296/190.03 |
| 7,401,673 B2 | 7/2008 | Fukazawa et al. |
| 7,413,241 B2 * | 8/2008 | Murakami et al. ....... 296/190.08 |
| 2003/0111281 A1 | 6/2003 | Jo et al. |
| 2004/0004337 A1 | 1/2004 | Harshbarger |
| 2005/0006157 A1 | 1/2005 | Shioji et al. |
| 2005/0257680 A1 | 11/2005 | Russell |
| 2007/0056786 A1 | 3/2007 | Fukazawa et al. |

* cited by examiner

ROLLOVER PROTECTION CAB

CROSS-REFERENCE TO RELATED APPLICATIONS

This application claims benefit of U.S. Provisional App. No. 61/122,991, filed Dec. 16, 2008, which is hereby incorporated by reference in its entirety.

BACKGROUND OF THE INVENTION

1. Field of the Invention

Embodiments of the present invention generally relate to a rollover protection (ROP) cab.

2. Description of the Related Art

Large off-road machines are employed for moving large quantities of earth, such as in building highways or dams, and are used in hauling ore as a part of mining operations. These large machines are required to travel at fairly fast speeds for efficiency and economy of operation and normally travel on temporary road surfaces or over terrain on which work is being preformed. For this reason, these large off-road machines are somewhat dangerous to operate since conditions do not permit construction of smooth, level roadbeds in most work situations. With the heavy loads, at fairly fast speeds and uneven terrain, the possibility of rollover of large machines, while relatively infrequent, nevertheless, is a safety concern of manufacturers and users of such machines. For this reason, chassis of these machines include a protective structure for the cab, commonly known as a rollover protection structure (ROPS). This requires extensive additional design and testing of the vehicle chassis.

SUMMARY OF THE INVENTION

Embodiments of the present invention generally relate to a rollover protection (ROP) cab. In one embodiment, a rollover protection cab for a construction vehicle includes a structural frame defining cabin space for a vehicle operator. The structural frame is operable to substantially maintain the cabin space while withstanding a crushing load greater than or equal to twenty tons. The cab further includes a window; a door; a seat disposed in the cabin space; and controls for operating the vehicle disposed in the cabin space.

In another embodiment, a crawler includes an undercarriage and a main assembly. The undercarriage includes a lower frame; and two tracks. Each track includes a track frame coupled to the lower frame; and a track shoe supported by the track frame and movable around the track frame. The main assembly is supported by the undercarriage so that the main assembly may rotate relative to the undercarriage. The main assembly includes a main frame; a boom pivoted to the main frame; and a rollover protection cab fastened to the main frame. The cab includes a structural frame defining cabin space for an operator. The structural frame is operable to substantially maintain the cabin space while withstanding at least a substantial portion of a weight of the crawler. The structural frame is independent from the main frame. The cab further includes a window; a door; and a seat disposed in the cabin space.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
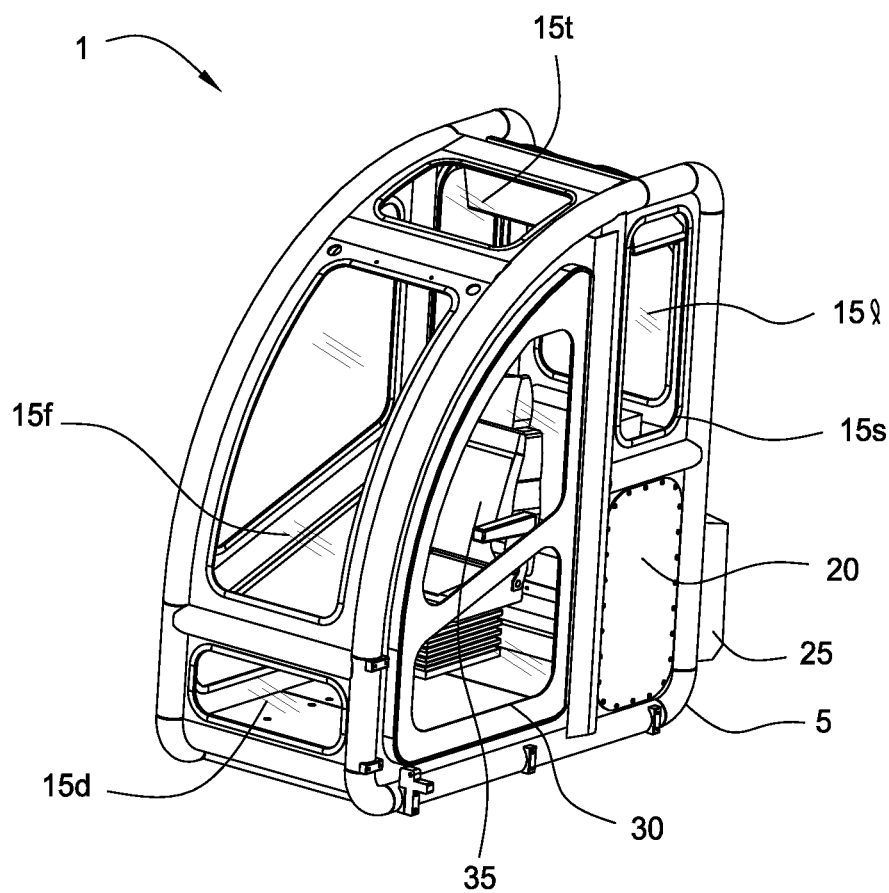
FIGS. 1A-1D are various views of an ROP cab, according to one embodiment of the present invention.
Figure 1B:
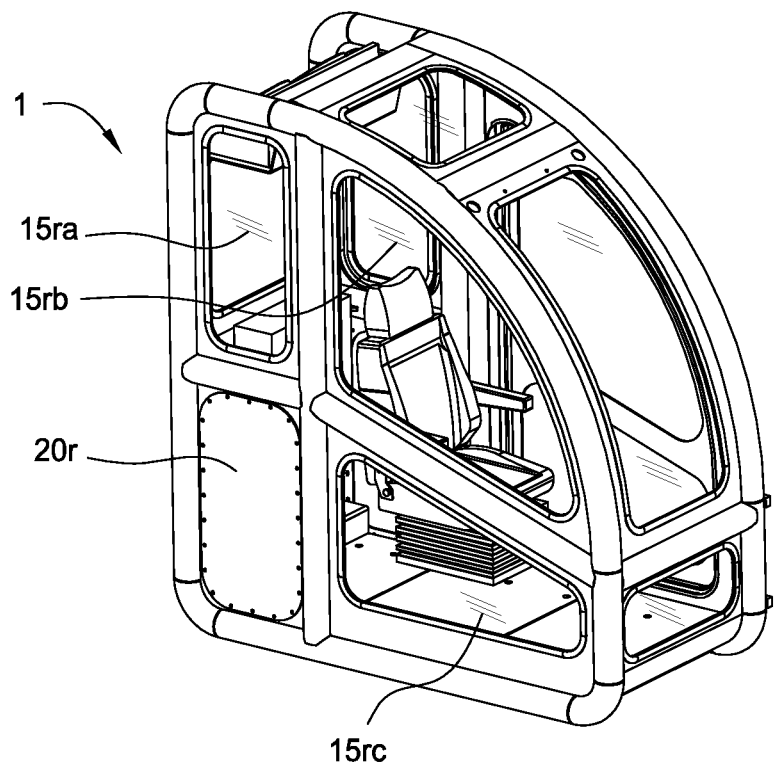
Figure 1C:
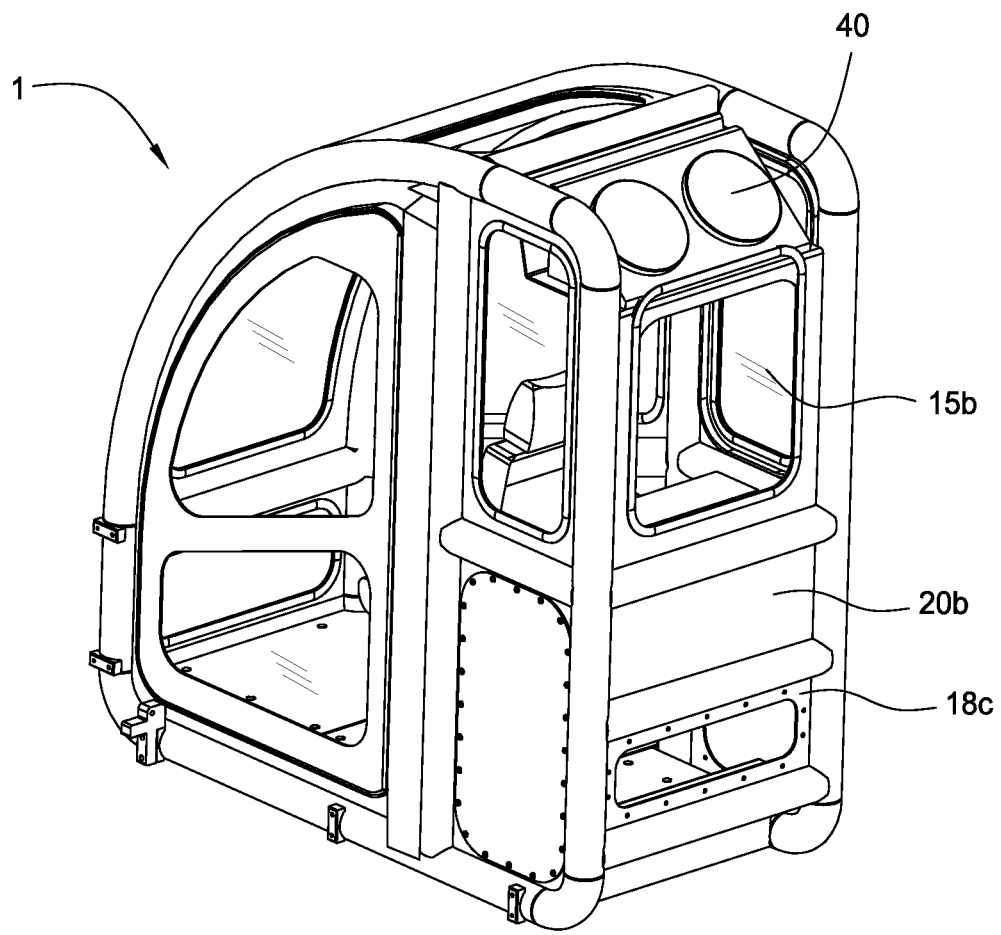
Figure 1D:
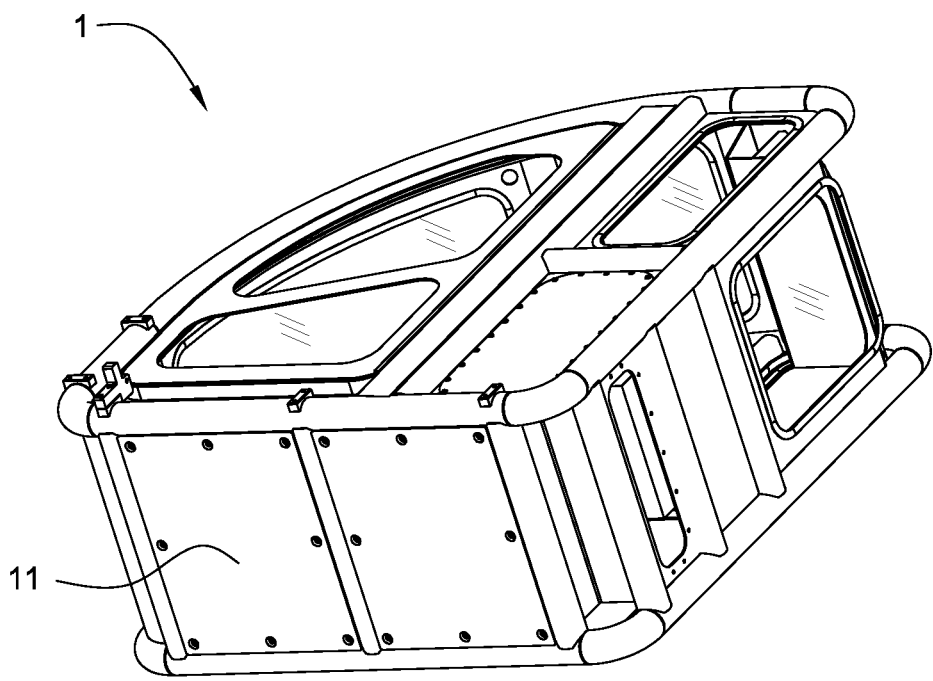

FIGS. 1A-1D are various views of an ROP cab 1, according to one embodiment of the present invention. The cab 1 may include a structural frame 5, one or more floor panels 11, one or more windows 15$b,d,f,\ell,,ra,rb,rc,t$, one or more body panels 20$\ell,,r,b,d$, control panel 20$c$, mounting brackets 25, door 30, seat 35, control center 100 (see FIG. 1E), and a climate control system 40. The climate control system 40 may include an air conditioner and/or heater. The control center 100 (including the seat 35) may be disposed within a cabin space defined by the structural frame 5. The body panels 20$\ell,,r,b,d$ may be plates and welded (i.e., 20$b,d$) or fastened (i.e., 20$\ell,,r$) to the structural frame 5. The control panel 20$c$ may be fastened to the structural frame 5.

The structural frame 5 may be made from heavy-wall steel pipe and have adequate strength to withstand a crushing force, such as at least twenty tons, fifty tons, one hundred tons, or two hundred fifty tons. Alternatively, the structural frame 5 may be configured to withstand at least a substantial portion of the weight of a construction vehicle, on which the cab 1 is mounted. Additionally, the structural frame 5 may be configured to withstand the weight of the vehicle or the weight of the vehicle plus a safety margin. Alternatively, the structural frame 5 may be made from another alloy or metal or a composite, such as a fiber-resin composite. Alternatively, the structural frame 5 may be made to meet or exceed any one or more of the following standards: SAE J1040, ISO 3471, SAE J154, SAE J397, SAE J1043, SAE J1164, SAE J1194, and SAE J2194.

The crushing force may result from tipping or rollover of the construction vehicle on which the cab 1 is mounted. The structural frame 5 may withstand application of the crushing force from one or more directions, such as the force exerted on top of the cab 1, the force exerted on the front of the cab 1, and/or the force exerted on sides of the cab 1. The structural frame 5 may deflect upon being loaded by a weight of the vehicle; however, the structural frame may substantially maintain the cabin space during loading, such as at least eighty percent, eighty-five percent, or ninety-percent. Alternatively, the structural frame 5 may be made from other structural shapes instead of pipe, such as I-beam, channel, angle, or rectangular (including square).

The structural frame 5 may be integral to the cab 1 so that the cab 1 requires no rollover protection from the vehicle's chassis. This independence allows for the cab 1 to be designed and tested separately from the vehicle, thereby freeing the vehicle design from having rollover structure to protect the cab. This independence may also allow the cab 1 to be modular with respect to an array of construction vehicles, including incorporation in newly designed vehicles or retrofit for existing vehicles.

Figure 1E:
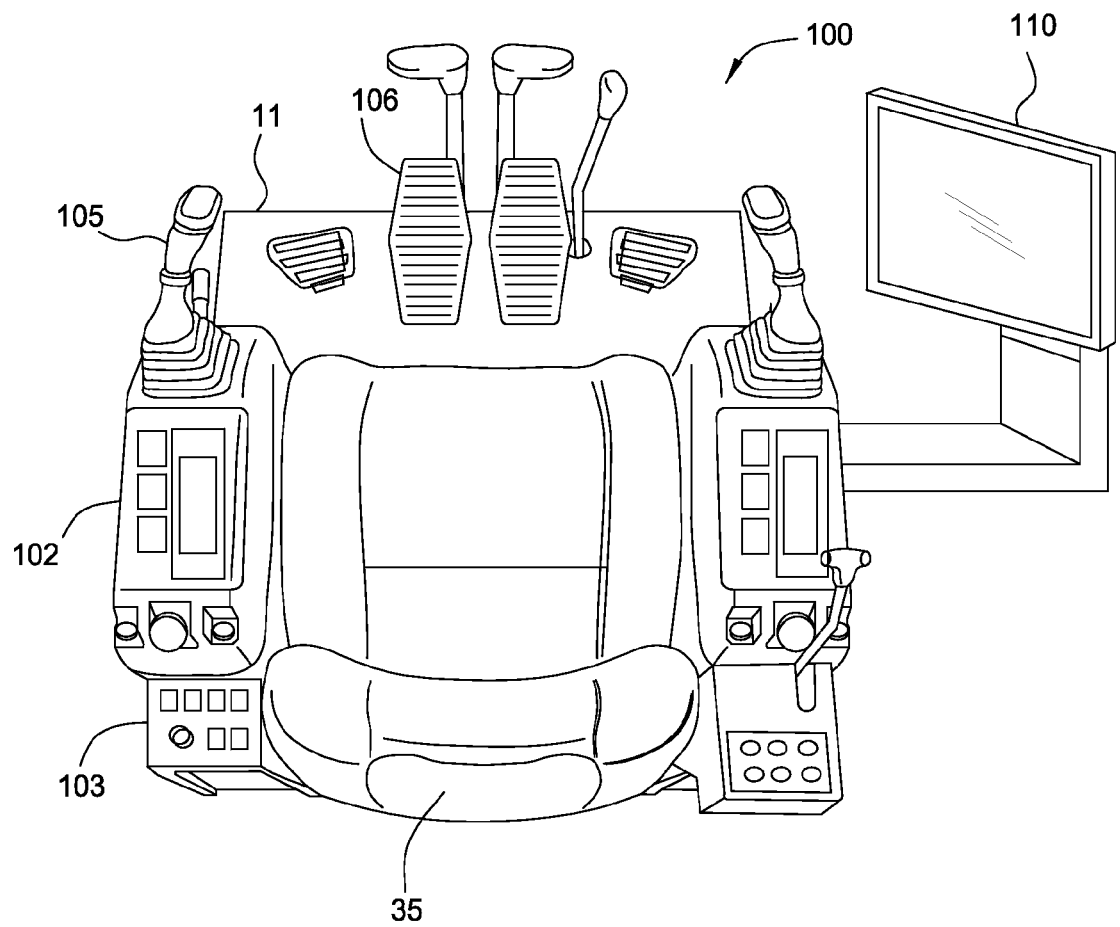
FIG. 1E is a plan view of a control center of the ROP cab.
Figure 2A:
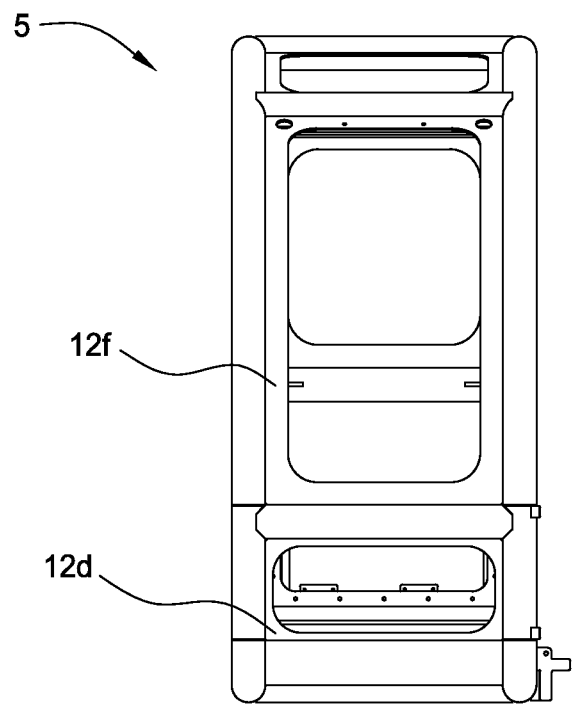
FIGS. 2A-2F illustrate the structural frame of the cab.
Figure 2B:
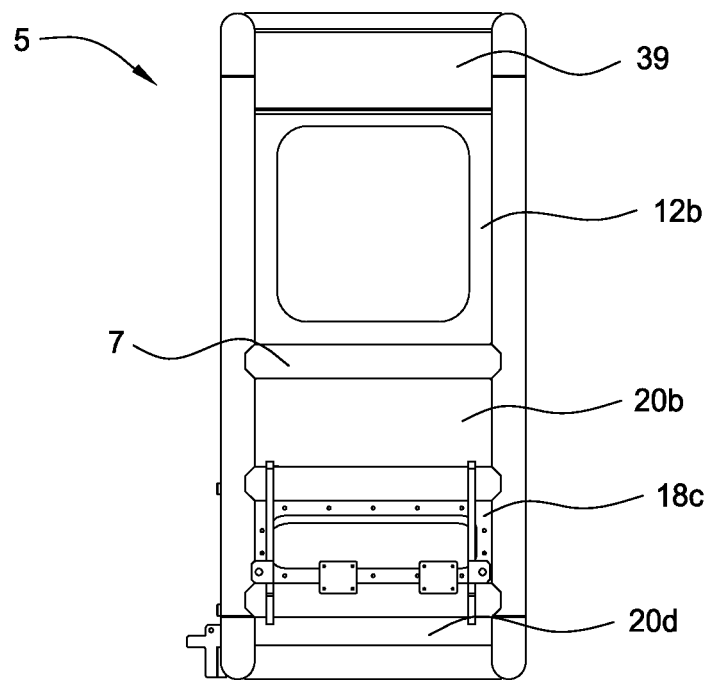
Figure 2C:
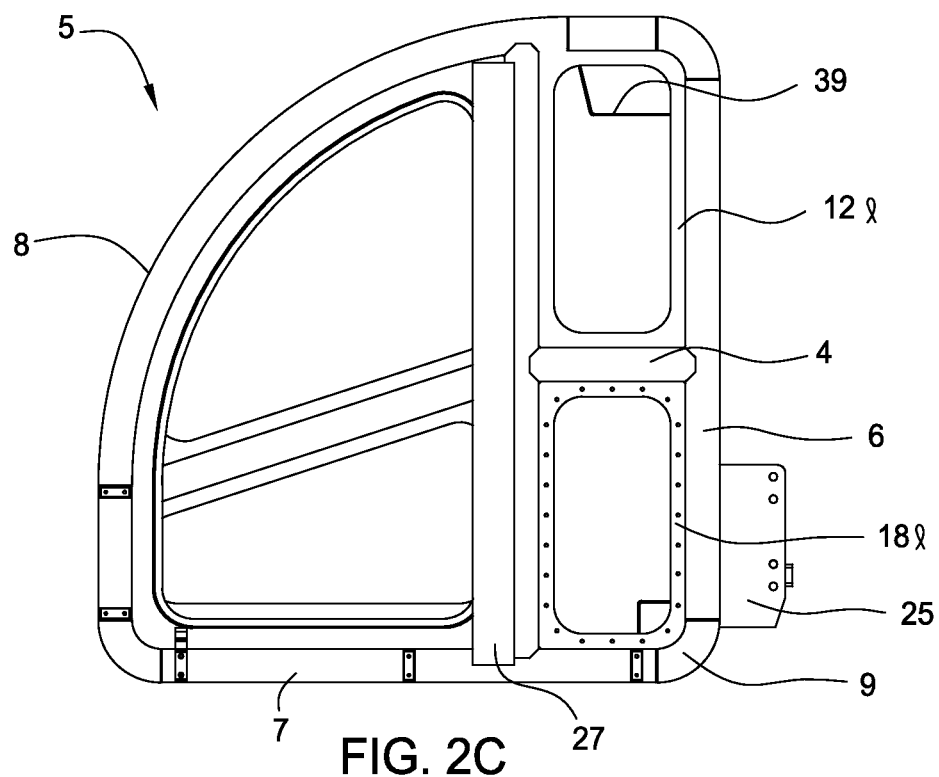
Figure 2D:
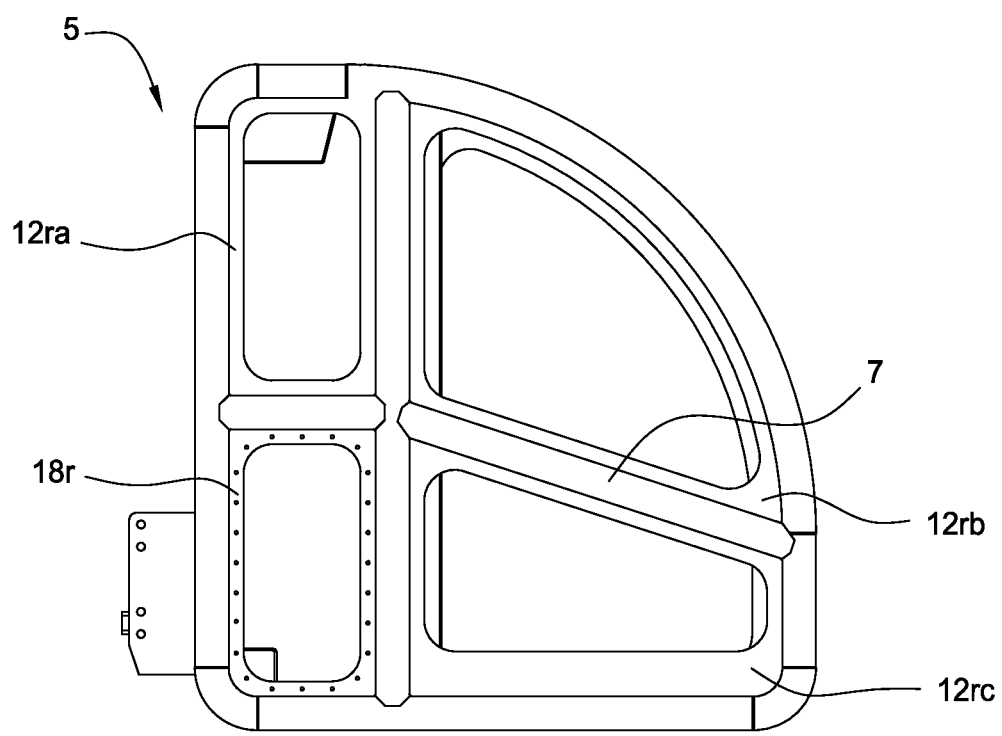
Figure 2E:
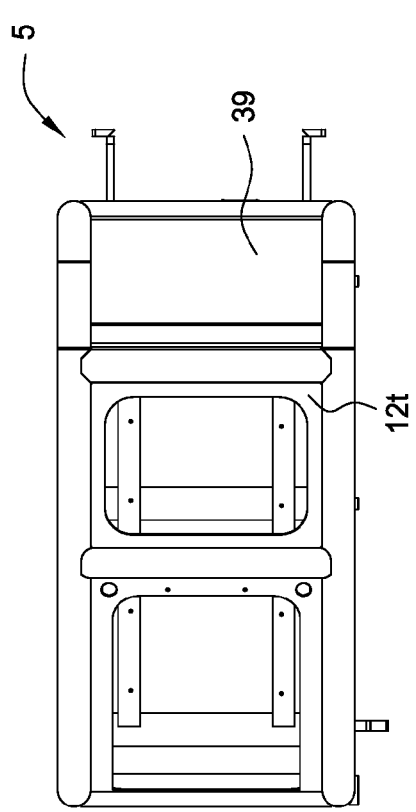
Figure 2F:
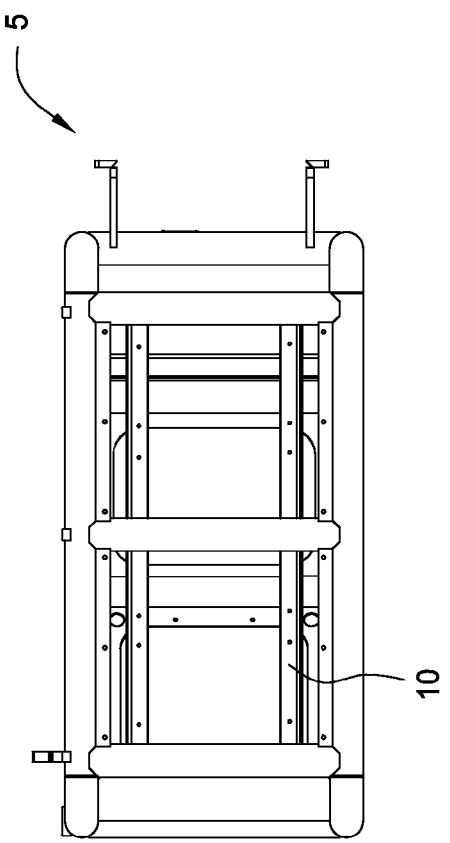

FIG. 1E is a plan view of a control center 100. The control center 100 may include the operator's seat 35, one or more hand-operable joysticks 105, one or more consoles 102, 103, one or more foot-operable pedals 106, and a video display 110. The consoles 102, 103 may include various pushbuttons and/or switches to control various functions of the vehicle. Alternatively, the consoles 102, 103 may be located overhead instead of adjacent the seat 35 or some of the pushbuttons and/or switches may be located adjacent to the seat and some overhead. The video display 110 may be a flat panel monitor, such as LCD or plasma. The video display 110 may display an operational status of the vehicle, such as video gauges, load graphs, and/or system messages. The control center 100 may further include a controller (not shown), such as a microprocessor, located behind the seat 35. The controller may be in electrical, i.e., power and data, communication with the consoles 102, 103, joysticks 105, foot pedals 106, and video display 110. The controller may be in hydraulic and/or electrical communication with a manifold of the vehicle via conduits extending through the control panel 20*c*.

The controller may include a load management system (LMS). The LMS may be a include a variety of sensors in communication with the controller to calculate and display boom angle, boom capacity, and/or the boom load. The LMS may include a database of boom capacities for various operating positions and surface grades. The LMS may alert the operator, with audio and/or visual warnings, when rated capacity is imminent, reached, and/or exceeded.

FIGS. 2A-2F illustrate the structural frame 5 of the cab 1. The structural frame 5 may include columns 6, beams 7, curved beams 8, and elbows 9. The structural frame 5 may be connected by welds. The columns 6, beams 7, 8, and elbows 9, may be connected by butt-welds. The structural frame may further include one or more sub-frames, such as floor frame 10, window frames 12*b,d,f,l,,ra,rb,rc,t*, door frame 27, body panel frames 18*l,,r*, climate control base 39, and control panel frame 18*c*. The sub-frames may be plates welded to the structural frame 5. Openings may be cut out from the sub-frames before or after the sub-frames are welded to the structural frame 5.

The windows 15*b,d,f,l,,ra,rb,rc,t* may be made from a transparent polymer, ceramic, or composite, such as polycarbonate (PC), polymethyl methacrylate (PMMA), tempered glass, laminated glass, aluminium oxynitride, magnesium aluminate spinel, or aluminum oxide. The windows 15*b,d,f, l,,ra,rb,rc,t* may be mounted on the window frames 12*b,d,f, l,,ra,rb,rc,t* by an adhesive or fasteners. The windows 15 may be sufficiently impact-resistant to protect the operator from falling objects. The front window 15*f* may be curved to improve operator visibility forward and/or above the cab 1. Some of the windows, i.e., the front window 15*f* and/or the window 15*ra* opposite the door 35, may serve as an escape-hatch for the operator. These escape-hatch windows may have quick-release fasteners 310 (see FIG. 3B) to allow the operator to release the window after rollover and be adequately sized for the operator to climb through. Alternatively, the escape-hatch windows may be mounted so that the operator may detach the windows by a kick from the seat 35.

A seal 15*s* may be disposed on each of the window frames 12*b,d,f,l,,ra,rb,rc,t*, the floor frame 10, and/or the door frame 27 so that the cabin 1 is air-tight. A filter may be disposed on an inlet of the climate control system 40 to filter exhaust fumes. The climate control system 40 may also maintain positive pressure in the cab 1 to ensure that any leaks are from the cab 1 to the environment and not vice-versa. The cab 1 may further include an air or oxygen tank (not shown) so that if the vehicle falls in water, the operator may wear a mask in communication with the tank. The tank may store an amount of air or oxygen, such as one hour to twenty-four hours, to allow a rescue crew to retrieve the operator before drowning of the operator.

The floor frame 10 may include angle or L-shaped beams having openings (i.e., nuts welded to holes formed therethrough) for receiving fasteners to retain the floor panels 11. The floor panels 11 may be made from metal, alloy, or polymer. A doorway may be cut out from the door frame 27 for receiving the door before or after the frame is welded. Hinges (not shown) may be welded or fastened to the door frame 27. The door frame 27 may include a plate and/or L-shaped beam welded to the structural frame 5.

The mounting brackets 25 may be welded to the structural frame 5. The mounting brackets 25 may have holes formed therethrough for receiving fasteners to retain the cab 1 to the vehicle. The fasteners may be conventional (i.e., bolts or threaded studs). The fasteners and mounting brackets 25 may be configured to retain the cab 1 to the vehicle during tip-over or rollover (i.e., have a similar design strength to the structural frame 5). The mounting brackets 25 may serve as the sole support from the vehicle's chassis or main frame so that the vehicle chassis or main frame may omit a separate structure for the cab, thereby reducing expense of the vehicle chassis design.

Alternatively, the fasteners may be frangible so that the cab 1 may detach from the vehicle upon a predetermined force exerted on the cab 1 during tipping or rollover of the vehicle. Configuring the cab 1 to separate from the vehicle during tipping or rollover may be beneficial so that the operator is not trapped within the cab 1 after the vehicle has rolled over, such as if the door 30 is sandwiched between the machine and the ground and/or the structural frame deforms and wedges the door shut. The predetermined force necessary to shear the frangible fasteners may be a ratio of the vehicle's weight, such as one-tenth to three-quarters or one-quarter to one-half of the vehicle's weight to ensure that the cab 1 separates from the vehicle before the entire weight of the machine rests on the cab 1.

Figure 3A:
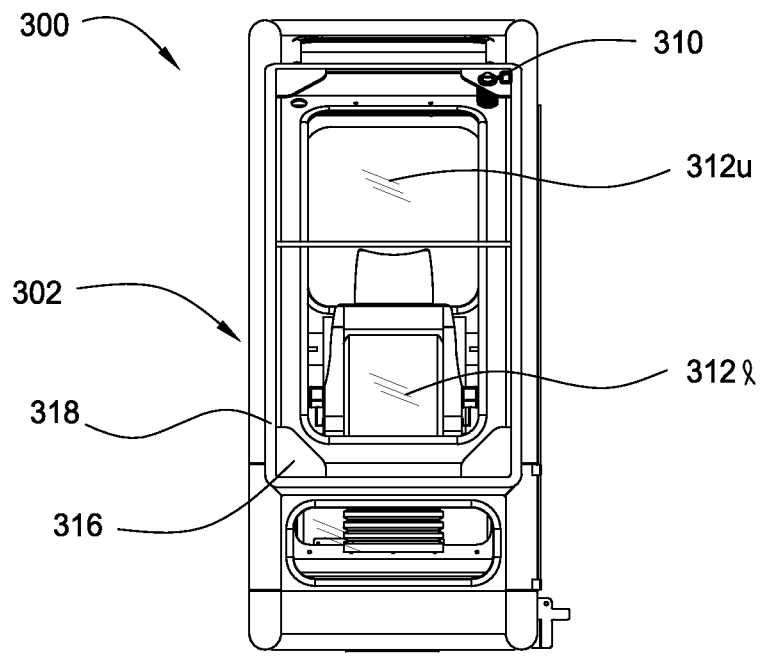
FIGS. 3A-3B illustrate an alternative ROP cab, according to another embodiment of the present invention.
Figure 3B:
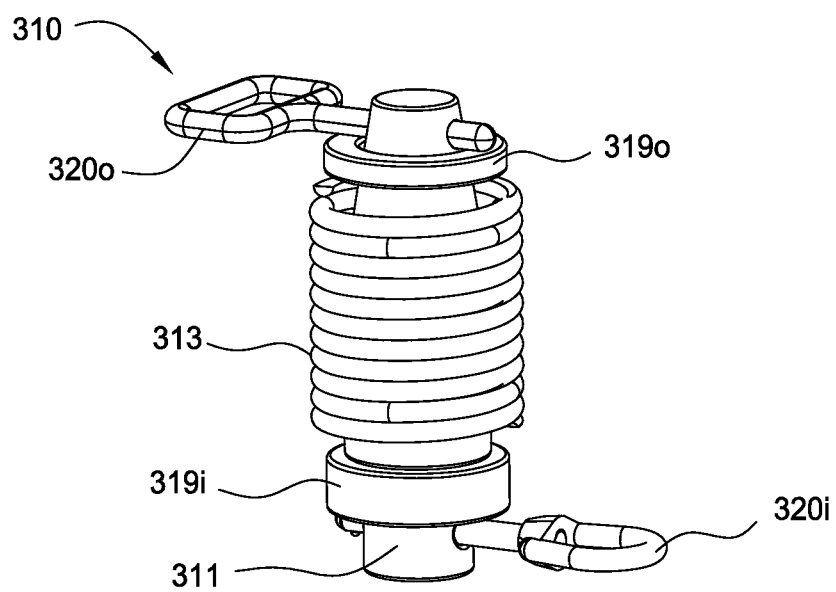

FIGS. 3A and 3B illustrate an alternative ROPS cab 300, according to another embodiment of the present invention. The cab 300 may be similar to the cab 1 with the addition of a falling object protection shield (FOPS) 302. The FOPS 302 may be curved to correspond to the curved front window. The FOPS 302 may include a frame 318, one or more plates 312*u, l,*, one or more pads 316, and one or more fasteners 310. The FOPS 302 may include a pad 316 and fastener 310 adjacent each corner of the frame. The plates 312*u,l* may be made from any of the materials discussed above for the windows. The plates 312*u,l* may each be bonded to the frame 318 and the pads 316 may be bonded to the plates 312*u,l* A hole may be formed through each pad 316 and plate 312*u,l* for receiving a respective fastener 310. A corresponding hole may be formed through the front window frame 12*f* for receiving each fastener. Each fastener 310 may include a shaft 311, washers 319*i,o*, a spring 313, and pins 320*i,o*. Each pin 320*i* may be disposed in the cabin space and each pin 320*o* may be externally disposed. The washer 319*i* may be disposed between the pin 320*i* and an inner surface of the window frame 12*f* and the washer 320*o* may be disposed between the external pin 320o and the pad 316. The spring 313 may be disposed between an outer surface of the window frame 12f and an inner surface of the respective plate 312u,ℓ, , thereby biasing the FOPS 302 away from the window frame 12f. The fasteners 310 allow for the operator to quickly release the shield 302 from the cab by pulling each pin 320i from the shaft 311.

Figure 3C:
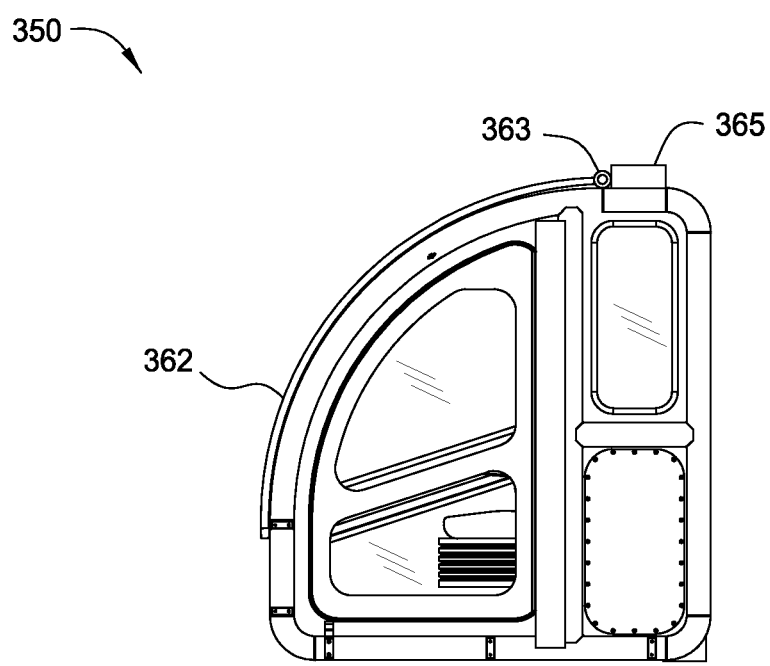
FIGS. 3C-3D illustrate an alternative ROP cab, according to another embodiment of the present invention.
Figure 3D:
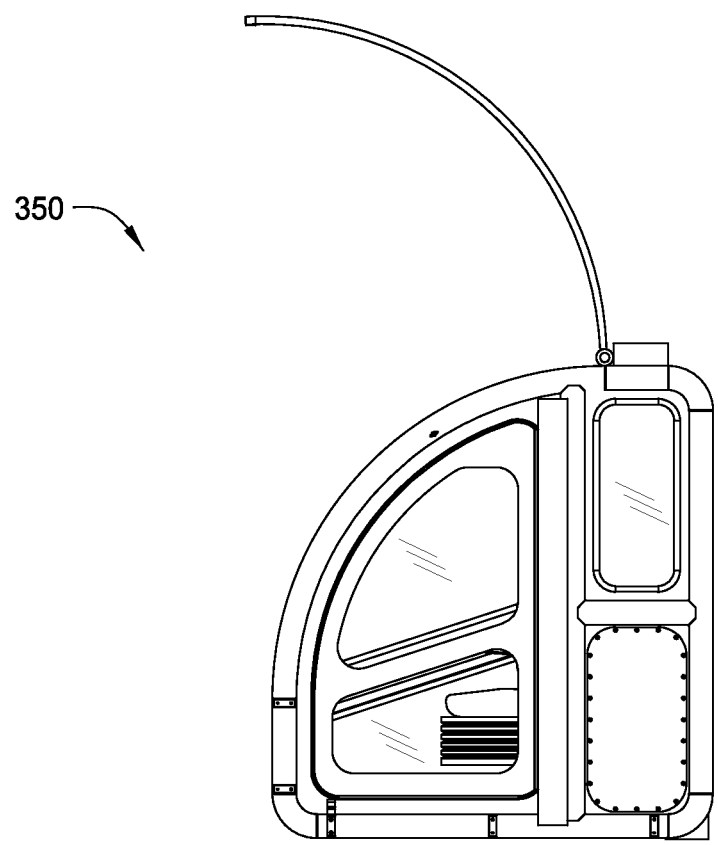

FIGS. 3C and 3D illustrate an alternative ROPS cab 350, according to another embodiment of the present invention. The cab 350 may be similar to the cab 1 with the addition of a FOPS 362. The FOPS 362 may be curved to correspond to the curved front window. The FOPS 362 may include a grating of curved beams, such as pipe, rods, or expanded metal or alloy, joined at each longitudinal end by beams 363, such as pipe or rods. The curved beams may be spaced apart to allow visibility therethrough by the operator. The FOPS 362 may further include an actuator 365 rotationally coupled to one of the braces and mounted to the cab 300. The actuator 365 may include a hydraulic or electrical motor to pivot the FOPS 362 between an engaged position as shown and a disengaged position. A switch may be disposed in the cab 350 to allow the operator to operate the actuator 365 between the positions. The operator may desire the FOPS 362 to be disengaged during jobs that have a minimal risk of falling objects to obtain better visibility and the FOPS to be engaged during jobs that have a substantial risk of falling objects. Alternatively, the actuator may be omitted and the FOPS 362 may be manually actuated between the positions. Alternatively, the FOPS 362 may be fixed to the cab in the engaged position.

Figure 4A:
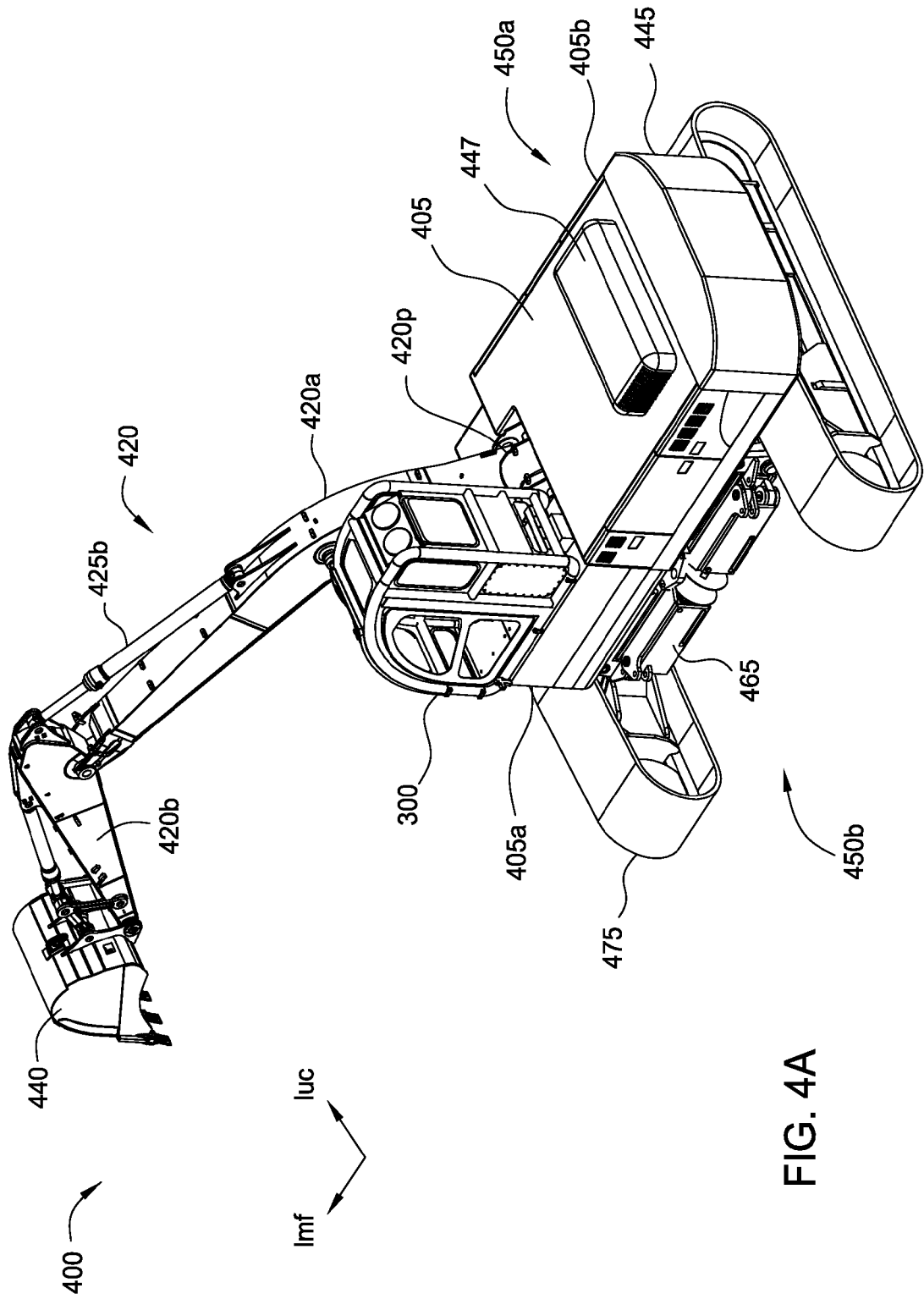
FIGS. 4A and 4B are views of an excavator, according to another embodiment of the present invention.
Figure 4B:
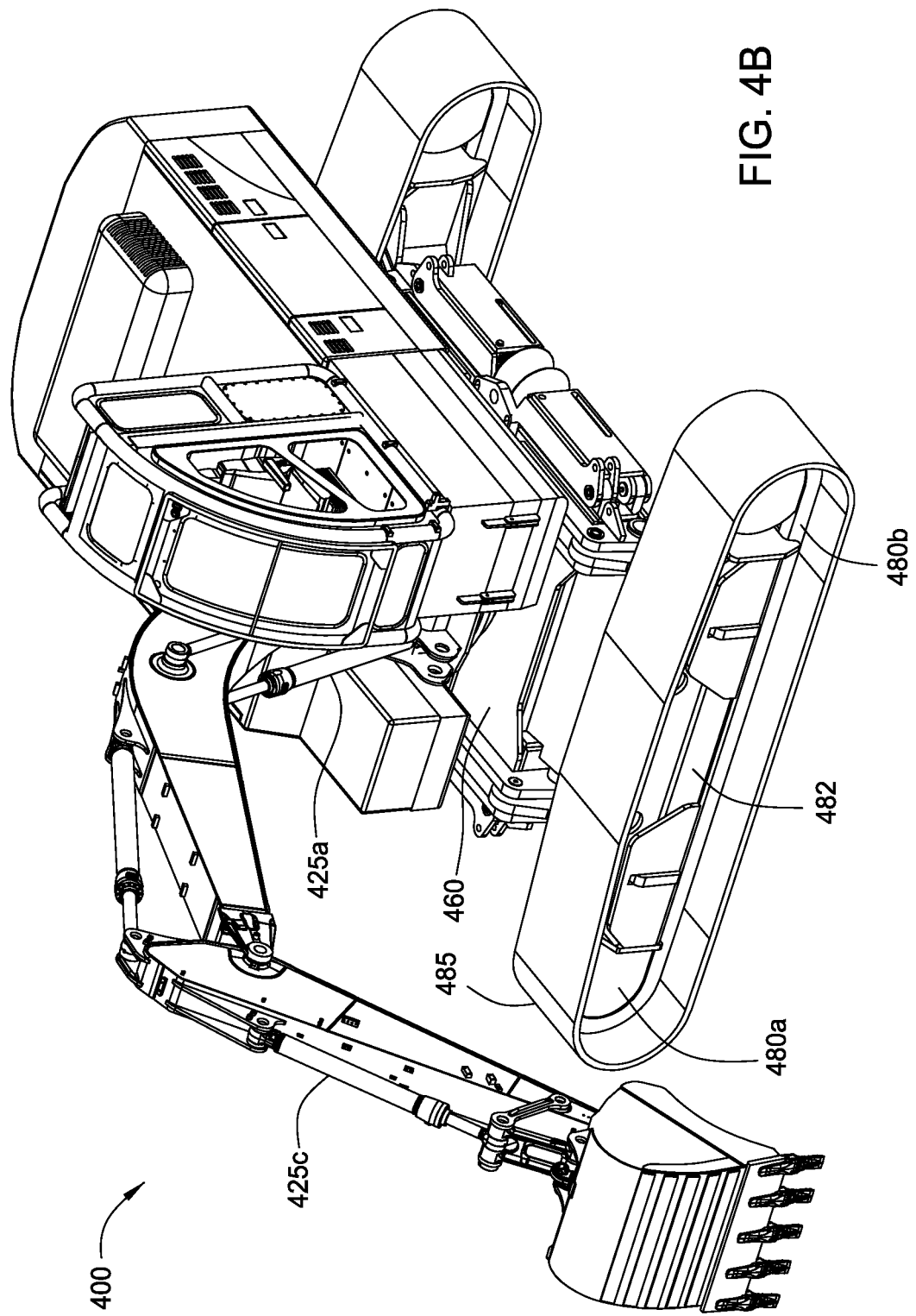
Figure 4C:
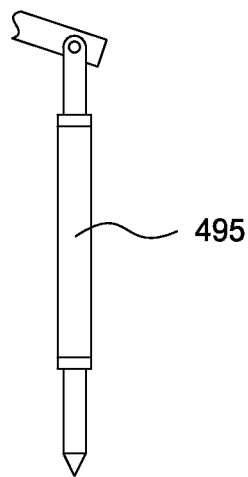
FIG. 4C is a view of a jackhammer that may be used with the excavator instead of the shovel.

FIGS. 4A and 4B are views of a crawler, such as an excavator 400, according to another embodiment of the present invention. FIG. 4C is a view of a jackhammer 495 that may be used with the excavator 400 instead of a shovel 440. The excavator 400 may include a main assembly 450a mounted on an undercarriage 450b so that the main assembly 450a may rotate relative to the undercarriage 450b. In the position illustrated, a longitudinal axis $L_{mf}$ of the main assembly 450a is perpendicular to a longitudinal axis $L_{uc}$ of the undercarriage 450b.

The main assembly 450a may include a main frame 405, the cab 300, a boom assembly 420, a counterweight 445, and an engine 447. The main frame 405 may have a front 405a and a back 405b distal from the front 405a. The boom assembly 420 may be pivoted 420p to the main frame at or near the front 405a. The cab 300 may be fastened to the main frame 405 via the mounting bracket 25. Alternatively, the cab may be fastened to the main frame via a hydraulic or electrical cab actuator (see FIGS. 5A-5D). The cab actuator may allow the cab to pivot and/or elevate relative to the main frame 405, thereby allowing operator adjustment to improve visibility. For example, the cab actuator may pivot the cab so that the curved front widow faces above the excavator 400 for demolition work. Alternatively, the cab 1 or 350 may be used with the excavator 400 instead of the cab 300.

The boom assembly 420 may include a boom 420a and an arm or stick 420b pivoted to the boom 420a. One or more first PCAs 425a may be pivoted to the main frame at or near the front 405a and pivoted to the boom 420a for articulating the boom 420a relative to the main frame 405. A second PCA 425b may be pivoted to the boom 420a and the stick 420b for articulating the stick 620b relative to the boom 620a. A bucket 440 may be pivoted to the stick 420b. A third PCA 425c may be pivoted to the stick 420b and the bucket 440 via a linkage for articulating the bucket 440 relative to the stick 420b. Alternatively, a jackhammer 495 may replace the shovel 440 for demolition work. Alternatively, a grapple, shear, or pulverizer may replace the shovel 440. Alternatively a demolition boom assembly may replace the boom assembly 420. Alternatively, the boom assembly 420 may be removed and an adaptor fastened to the boom 420p and first PCA pivots to allow a crane boom to be pivoted to the adaptor, as discussed and illustrated in U.S. Pat. No. 6,003,252, which is herein incorporated by reference in its entirety. Alternatively, the adaptor may accept a pipelayer (i.e., A-frame boom) so that the pipelayer boom may be pivoted to the main frame using the adaptor.

The counterweight 445 may be vertically supported and longitudinally coupled to the main frame 405 at the back 405b. Housed near the back 405b of the main frame 405 may be the engine 447. The engine 447 may drive a hydraulic pump (not shown) and a generator or alternator (not shown) for providing hydraulic or electrical energy to components, such as the cab 300, the PCAs 425a-c, and the track rollers 480 via a manifold (not shown). Associated hydraulic and/or electrical circuitry (not shown) interconnecting these components may also be provided. The engine may be a diesel engine or an alternative fuel engine. Examples of alternative fuel engines include diesel-electric hybrid and hydrogen fuel-cells. The diesel-electric hybrid may use a smaller diesel engine and a bank of batteries (not shown) which would allow operation of the excavator 400 without operation of the diesel engine.

Rotation of the main assembly 450a relative to the undercarriage 450b and support for the main assembly 450a by the undercarriage 450b may be provided by a rotary drive mechanism (not shown) and a bearing (not shown). The rotary drive mechanism may include a hydraulic or electric motor (not shown) attached to the main frame 405 and rotationally coupled to a pinion (not shown) which meshes with a gear (not shown) rotationally coupled to the undercarriage 450. Operation of the motor may rotate the main assembly 450a relative to the undercarriage 450b. The rotary drive mechanism may further include a slew lock mechanism (not shown) for selectively rotationally coupling the main assembly 450a relative to the undercarriage 450b. The slew lock mechanism may include a gear tooth (not shown) selectively engageable with the gear via operation of a hydraulic cylinder or electic motor (not shown) and a proximity switch to verify engagement of the tooth with the gear. Engagement of the gear with the tooth rotationally couples the main assembly 450a to the undercarriage 450b. Verification of engagement by the proximity switch also prevents operation of the motor.

Alternatively, the slew lock mechanism may include a disk (not shown) incorporated in the motor and a retaining mechanism for retaining the disk. The slew lock mechanism is such that when the rotary motor is stopped, the disk is retained by the retaining mechanism to fix a rotor of the motor so as not to rotate, and when the motor is started, the disk is hydraulically or electrically disengaged from the motor, thereby freeing the rotor.

The undercarriage 450b may include a lower frame 460 attached to the bearing and two track assemblies 475, each fastened to the lower frame 460. Each of the track assemblies 475 may include a track frame 482 and one or more rollers 480a,b, such as sprockets, operatively coupled to a track shoe or belt 485. The track shoe 485 may extend around the track frame 482 and be movable relative to the track frame. The rollers 480a, b may be supported by the track frame 482 so that the rollers may rotate relative to the track frame. One of the rollers 480a, b may be a drive sprocket and the other an idler roller. A rotor of an electric or hydraulic track motor (not shown) may be rotationally coupled to the drive sprocket and a housing of the track motor may be attached to the track frame. A conduit, such as an electrical cable or hydraulic hose, may extend from the main frame 405 to the track motor. The conduit may be connected to the track motor by a quick-connect fitting. Operation of the track motor may move the track shoe 485 relative to the track frame.

Alternatively, each of the track motor housings may be attached to the lower frame 460 and each rotor thereof rotationally coupled to a respective drive roller via a removable shaft. The shaft may be removably rotationally coupled at the track motor. Alternatively, each of the track assemblies 475 may be attached to the lower frame 460 by one or more telescoping axles (not shown). The telescoping axles may extend to provide a wide footprint for operation and retract to provide a narrow footprint for transportation.

To facilitate disassembly of the excavator 400 for transport and re-assembly of the excavator 400 for delivery to the next job site, each of the track assemblies 475 may include one or more lugs attached to the track frame 482. Each of the lugs may include a hook and a hole. Each of the lugs may be received in an opening of a bracket assembly attached to the lower frame 460. The bracket assembly may include two plates spaced apart to define the opening, each plate attached to the lower frame 460. Fasteners (i.e., a bolt or a pin) may each be disposed through corresponding holes in the plates. To fasten each track assembly 475 to the lower frame 460, the fastener may be removed and the hook may be engaged with the fastener and the fastener may then be inserted through holes in the plates and the hole and then locked to the track frame by a fastener (i.e., a nut or a clip). The track conduit may then be connected to the track motor by the quick-connect fitting. Alternatively, the lug may be attached to the lower frame 460 and the bracket assembly may be attached to the track frame 482.

To further facilitate disassembly for transport and re-assembly for delivery of the excavator 400, one or more outriggers 465 may be pivoted to the lower frame 460. Each outrigger 465 may include a first arm, a second arm, a third arm, and a pad. The first arm may be pivoted relative to the lower frame 460. The second arm may be pivoted to the first arm and retractable within the first arm. The third arm may be retractable within the second arm. The pad may be pivoted to the third arm. The outriggers 465 may be operable between an extended position and a retracted position.

To remove the track assemblies for transportation, the outriggers 465 may be extended to support the main frame. The boom assembly 420 may be used to hoist each track assembly 475 and load the track assembly on to a low-boy trailer. Once the track assemblies are loaded, a second low-boy may be backed underneath the excavator and the outriggers may then lower the excavator onto the second low boy. The boom assembly may then be folded. Alternatively, the excavator may be self-loaded on to only one low-boy.

Additionally, the cabs 1, 300, 350 may be used with other off-road vehicles, such as any type of crawler, such as cranes, side-booms, bulldozers, forestry carriers, waste handlers, or pipelayers. Additionally, the cabs 1, 300, 350 may be used for on-road or off-road vehicles, such as wheeled vehicles, such as tractors, loaders, skid-steers, forklifts, backhoes, articulated haulers, scraper haulers, motor graders, pavers, or compactors.

Figure 5A:
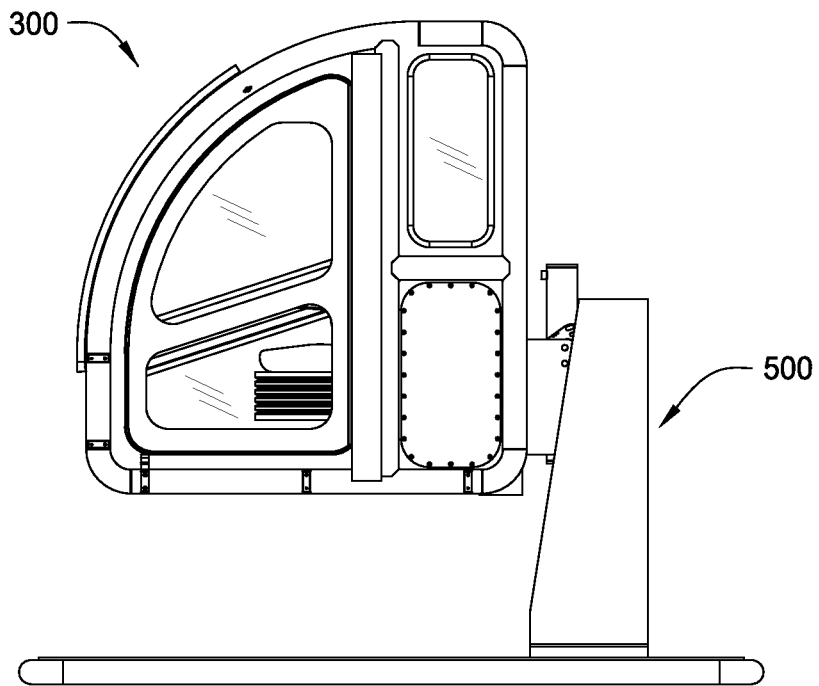
FIGS. 5A and 5B illustrate the cab mounted on a cab actuator, such as a riser, according to another embodiment of the present invention.
Figure 5B:
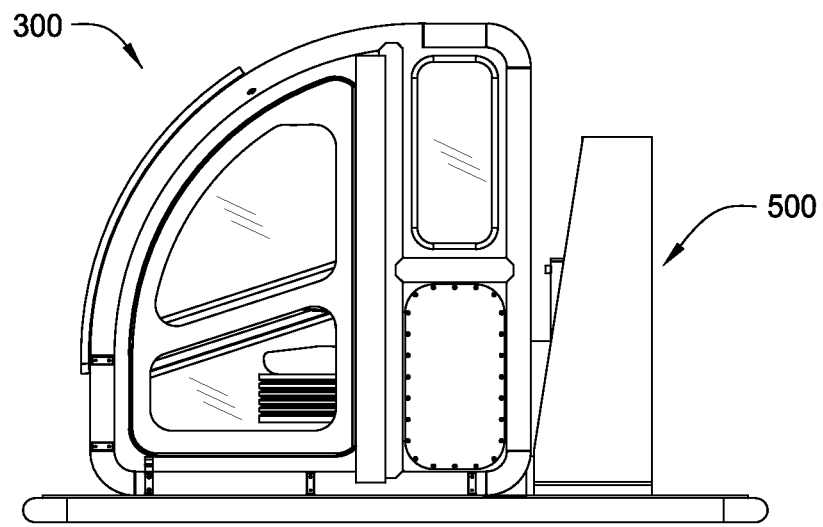
Figure 5C:
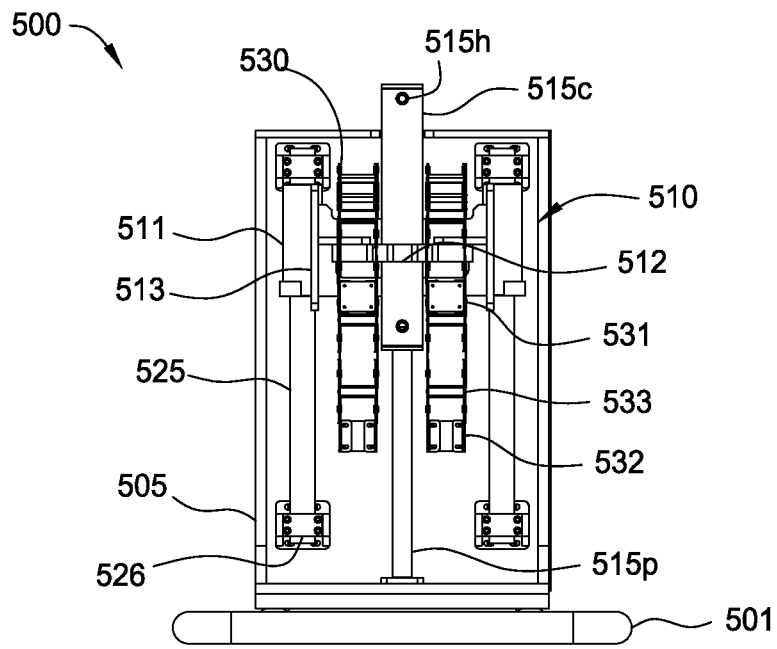
FIGS. 5C and 5D illustrate details of the riser.
Figure 5D:
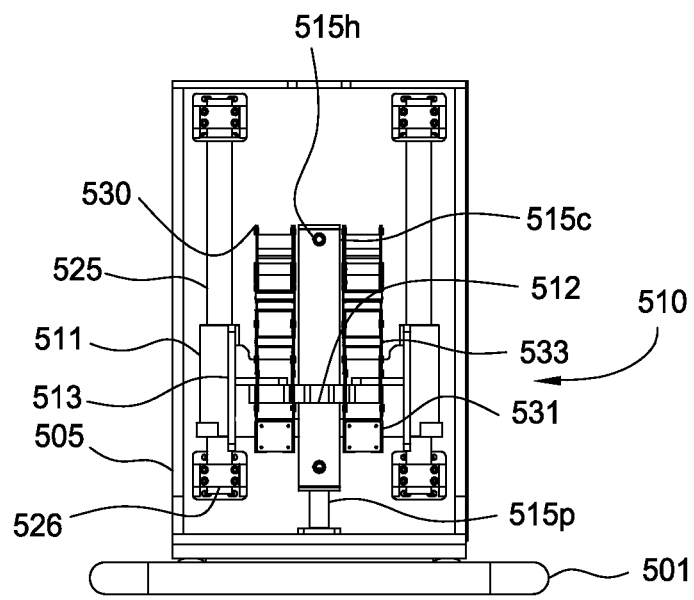

FIGS. 5A and 5B illustrate the cab 300 mounted on a cab actuator, such as a riser 500, according to another embodiment of the present invention. FIGS. 5C and 5D illustrate details of the riser. Alternatively, the riser 500 may be used with either of the cabs 1, 350. As shown, the cab riser 500 is mounted on a test stand 501. The cab riser 500 may be fastened to the main frame 405 and operable to vertically move the cab 300 between a raised position and a lowered position relative to the main frame 405. In this manner, the operator may adjust the height of the cab relative to the main frame to obtain optimum visibility. The cab riser 500 may raise the cab a maximum distance from a bottom of the main frame, such as one to six feet, such as about two and one-half feet.

The cab riser 500 may include a base 505, a frame 510, and a piston 515$p$ and cylinder 515$c$ assembly (PCA). The frame 510 may be moved relative to the base 505 by the PCA 515$p,c$. The frame 510 may include one or more guide sleeves 511 and one or more brackets 512, 513. The frame members 511-513 may each be fastened and/or welded together or integrally formed. Each guide sleeve 511 may be fastened to the PCA 515$p,c$ via the bracket 512. The bracket 512 may be fastened or welded to the cylinder 515$c$. The bracket 25 of the cab 300 may be fastened to the frame bracket 513. The PCA 515$p,c$ may be operable to raise or lower the frame 510 (and cab 300) relative to the base 505 (and main frame 405) via injection and/or removal of hydraulic fluid via one or more ports 515$h$. Alternatively, an electric motor may be used to raise or lower the base 505 instead of the PCA 515$p,c$. The PCA 515$p,c$ may be in fluid communication with the hydraulic system of the excavator 400 via a hydraulic conduit, such as a hose (not shown). The cab riser 500 may also include a lock (not shown) operable to retain the base 505 at a selected height. One or more guide posts 525 may be fastened to the base 505 via brackets 526. Each of the guide sleeves 511 may be laterally coupled to a respective guide post 525 and free to vertically slide along the respective guide post 525. The piston 515$p$ may be fastened to the base 505. Upon removal of the test stand 501, the base 505 may be fastened to the main frame 405.

The riser 500 may further include one or more conduits 530. The conduits 530 may each house one or more hydraulic hoses and/or electric cables (not shown) extending between the excavator manifold and the cab 300. The conduit 530 may also house the hydraulic hoses extending between the manifold and the PCA 515$p,c$. Each conduit 530 may include a first end fastened to the base 505 via bracket 532 and a second end fastened to the cab 300 via bracket 531. Alternatively, the second end may be fastened to the frame 510. Each conduit 530 may include a plurality of links 533, each link pivoted to other links 533 so that the conduit 530 may accommodate vertical movement of the frame 510 relative to the base 505. Each link 533 or every other link may include a top and bottom rung to house the cables and/or hoses, thereby protecting them from entanglement in the riser 500. The links 533 may be made from a metal or alloy, such as steel. Alternatively, the conduit may be a single member made from a flexible material, such as a polymer. Alternatively, the cab 300 may only be in electrical communication with the manifold via wireless power and data couplings, such as inductive couplings and/or RF transceivers. Alternatively, the PCA 515$p,c$ may be inverted.

While the foregoing is directed to embodiments of the present invention, other and further embodiments of the invention may be devised without departing from the basic scope thereof, and the scope thereof is determined by the claims that follow.

The invention claimed is:

1. A rollover protection cab for a construction vehicle, comprising:
   a structural frame defining cabin space for a vehicle operator, wherein:
   the structural frame is operable to substantially maintain the cabin space while withstanding a crushing load greater than or equal to twenty tons, the structural frame comprises curved front beams,
each beam has a constant curvature, and
each beam extends along a substantial portion of a front and top of the cab;
a front window having a curvature corresponding to the beam curvature for allowing visibility in front and above the vehicle;
a door;
a seat disposed in the cabin space; and
controls for operating the vehicle disposed in the cabin space.

2. The rollover protection cab of claim 1, further comprising a mounting bracket and fasteners for connecting the cab to the vehicle, wherein the bracket and fasteners are operable to withstand the crushing load.

3. The rollover protection cab of claim 1, further comprising a mounting bracket and frangible fasteners for connecting the cab to the vehicle, wherein the fasteners are operable to fracture at a predetermined load.

4. The rollover protection cab of claim 1, further comprising a shield covering the window.

5. The rollover protection cab of claim 4, wherein the shield is transparent.

6. The rollover protection cab of claim 1, further comprising a shield and an actuator operable to pivot the shield between an engaged position and a disengaged position, wherein the shield covers the window in the engaged position.

7. The rollover protection cab of claim 1, wherein the structural frame is made from pipe.

8. The rollover protection cab of claim 1, further comprising a cab actuator operable to move the cab relative to the vehicle.

9. The rollover protection cab of claim 1, wherein:
the front window comprises a pane and a frame directly fastened or welded to the structural frame, and
the door comprises a frame directly fastened or welded to the structural frame and a panel hinged to the door frame.

10. A crawler, comprising:
an undercarriage, comprising:
a lower frame; and
two tracks, each track, comprising:
a track frame coupled to the lower frame; and
a track shoe supported by the track frame and movable around the track frame; and
a main assembly supported by the undercarriage so that the main assembly may rotate relative to the undercarriage, the main assembly comprising:
a main frame;
a boom pivoted to the main frame; and
a rollover protection cab fastened to the main frame, the cab comprising:
a structural frame defining cabin space for an operator,
wherein:
the structural frame is operable to substantially maintain the cabin space while withstanding at least a substantial portion of a weight of the crawler,
the structural frame is independent from the main frame,
the structural frame comprises curved front beams,
each beam has a constant curvature, and
each beam extends along a substantial portion of a front and top of the cab;
a front window having a curvature corresponding to the beam curvature for allowing visibility in front and above the vehicle;
a door; and
a seat disposed in the cabin space.

11. The crawler of claim 10, wherein the structural frame is operable to withstand the entire weight of the crawler.

12. The crawler of claim 10, further comprising an arm or stick pivoted to the boom.

13. The crawler of claim 10, further comprising a mounting bracket and fasteners fastening the cab to the main frame, wherein the bracket and fasteners are operable to withstand the substantial weight portion.

14. The crawler of claim 10, further comprising a mounting bracket and frangible fasteners fastening the cab to the main frame, wherein the fasteners are operable to fracture at a predetermined load.

15. The crawler of claim 10, further comprising a shield covering the window.

16. The crawler of claim 15, wherein the shield is transparent.

17. The crawler of claim 10, further comprising a shield and an actuator operable to pivot the shield between an engaged position and a disengaged position, wherein the shield covers the window in the engaged position.

18. The crawler of claim 10, wherein the structural frame is made from pipe.

19. The crawler of claim 10, further comprising a cab actuator operable to move the cab relative to the main frame.

20. The crawler of claim 10, wherein:
the front window comprises a pane and a frame directly fastened or welded to the structural frame, and
the door comprises a frame directly fastened or welded to the structural frame and a panel hinged to the door frame.

* * * * *